United States Patent

Bosch et al.

[11] Patent Number: 5,839,053
[45] Date of Patent: Nov. 17, 1998

[54] SYSTEM FOR TRANSMITTING RADIO SIGNALS FROM MOBILE TERMINALS TO PROVIDE SPACE DIVERSITY FOR UPLINK SIGNALS VIA GEOSTATIONARY COMMUNICATION SATELLITES

[75] Inventors: Javier Ventura-Traveset Bosch, Leiden, Netherlands; Giuseppe Caire, Turin, Italy; Mike Yarwood, Noordwijk, Netherlands; Ezio Biglieri, Turin, Italy

[73] Assignee: Agence Spatiale Europeene, Paris, France

[21] Appl. No.: 689,153

[22] Filed: Jul. 30, 1996

[30] Foreign Application Priority Data

Aug. 2, 1995 [FR] France ................................ 95 09430

[51] Int. Cl.$^6$ .................................................. H04B 7/185
[52] U.S. Cl. ...................... 455/13.1; 455/427; 455/428; 455/505; 455/506
[58] Field of Search ................................ 455/11.1, 12.1, 455/13.1, 13.2, 13.3, 427, 428, 429, 430, 431, 504, 505, 506

[56] References Cited

U.S. PATENT DOCUMENTS

| 4,099,121 | 7/1978 | Fang | 455/13.2 X |
|---|---|---|---|
| 4,218,654 | 8/1980 | Ogawa et al. | 370/92 |
| 5,233,626 | 8/1993 | Ames | 455/13.1 X |
| 5,319,673 | 6/1994 | Briskman | 455/13.1 X |
| 5,410,731 | 4/1995 | Rouffet | 455/13.1 |
| 5,615,407 | 3/1997 | Barkats | 455/13.1 |
| 5,634,190 | 5/1997 | Wiedeman | 455/13.1 |

FOREIGN PATENT DOCUMENTS

| 2714778 | 12/1993 | France . |
| 2134353 | 1/1984 | United Kingdom . |
| 8804866 | 6/1988 | WIPO . |

OTHER PUBLICATIONS

3rd European Conference on Satellite Communications, 2–4 Nov. 1993 Manchester, UK, pp. 246–250, XP 000458015 P. Jung et al.

3rd European Conference on Satellite Communications, 2–4 Nov. 1993 Manchester, UK, pp. 325–329, XP 000458030 C. Cullen et al.

*Primary Examiner*—Wellington Chin
*Assistant Examiner*—Philip J. Sobutka
*Attorney, Agent, or Firm*—Sughrue, Mion, Zinn, Macpeak & Seas, PLLC

[57] ABSTRACT

The invention concerns a system for transmission of spatial diversity radio signals via a geostationary main communication satellite and one or more auxiliary satellites "colocated" in the same orbit. The distance between an auxiliary satellite and the main satellite is in the range from 200 km to 400 km. The system includes conventional bidirectional transmission links between terrestrial mobile terminals and the main satellite and between the latter and a terrestrial station. Additionally, unidirectional transmission links are provided between the auxiliary satellites and the main satellite. Applications include a mobile communication service with portable terminals via a geostationary satellite.

15 Claims, 2 Drawing Sheets

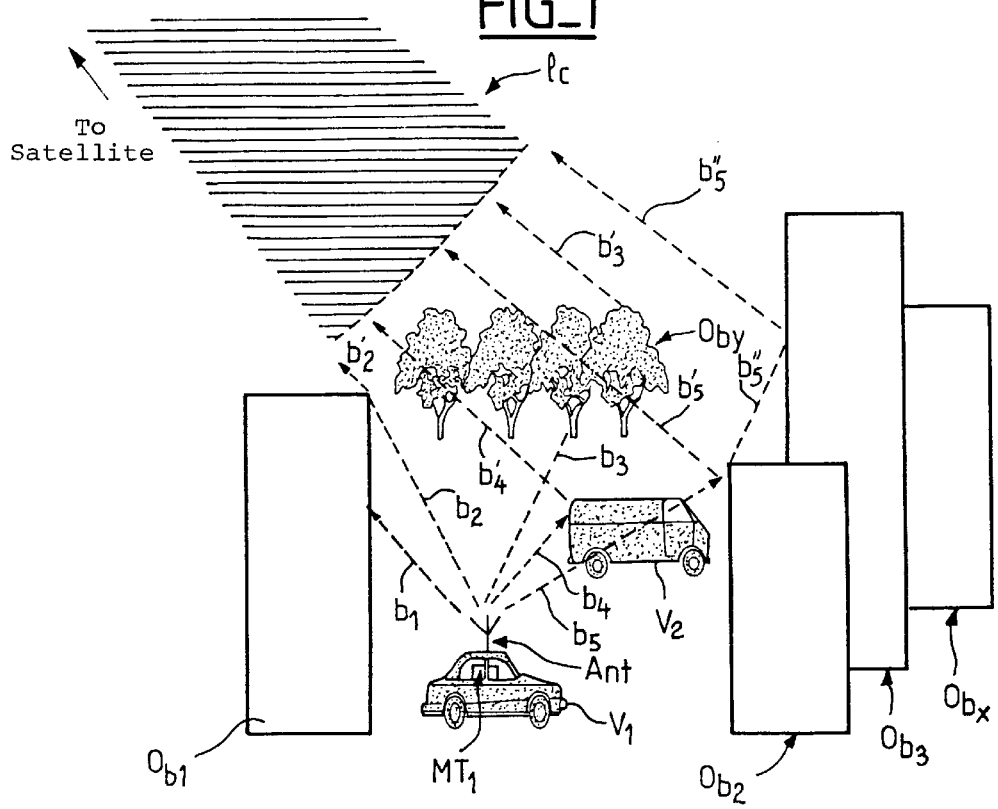
FIG_1
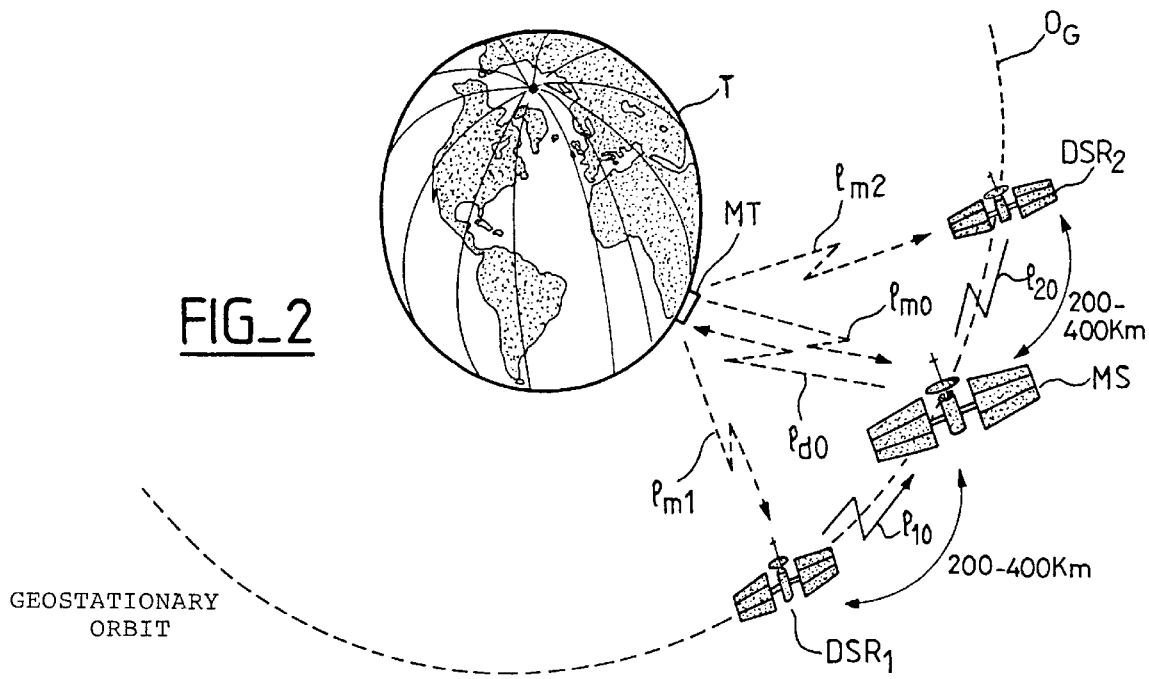
FIG_2

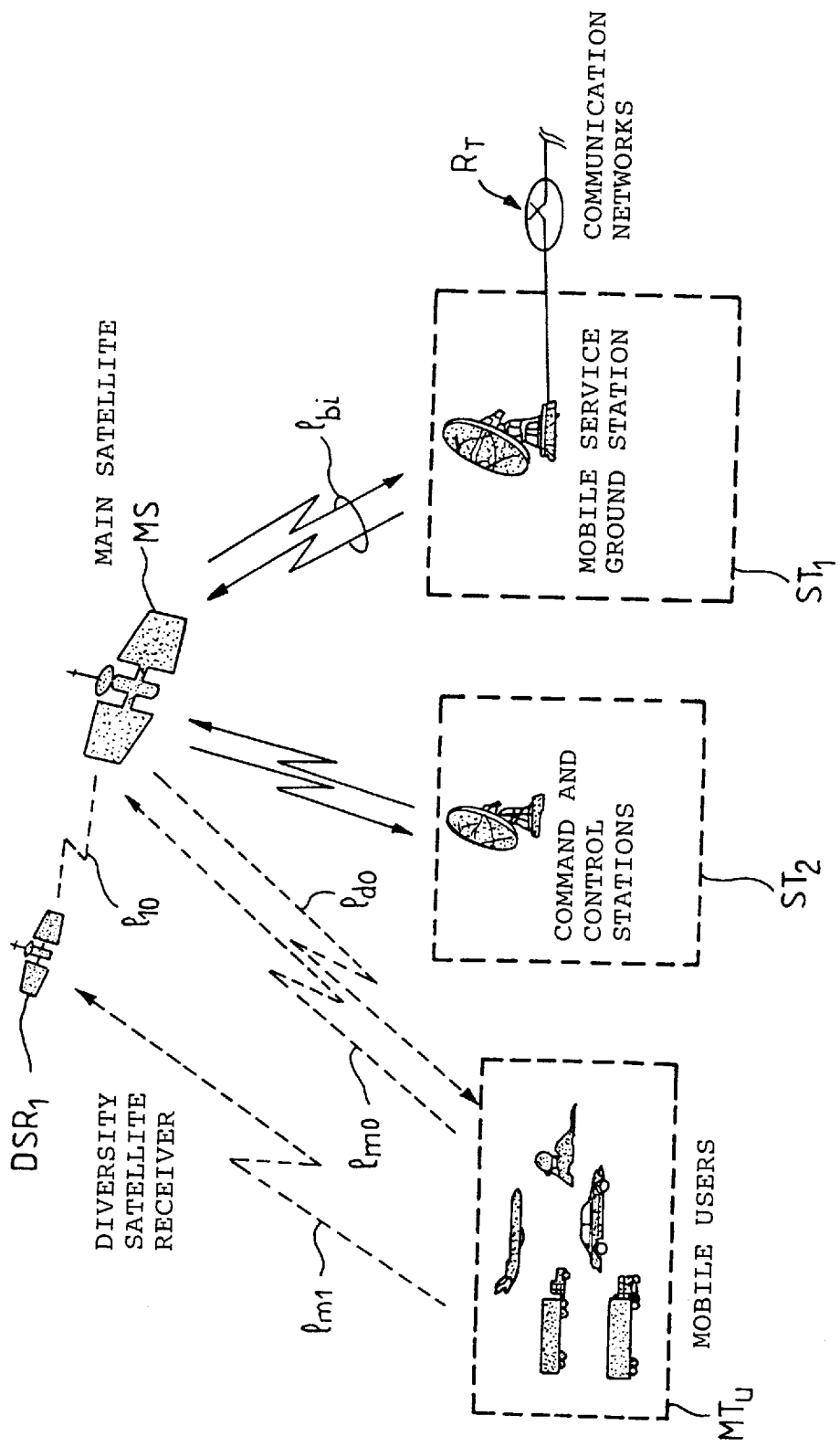
FIG_3

SYSTEM FOR TRANSMITTING RADIO SIGNALS FROM MOBILE TERMINALS TO PROVIDE SPACE DIVERSITY FOR UPLINK SIGNALS VIA GEOSTATIONARY COMMUNICATION SATELLITES

BACKGROUND OF THE INVENTION

1. Field of the Invention

The invention concerns a system for transmitting radio signals via a geostationary communication satellite.

It concerns, in particular, communications with terrestrial mobile terminals and more particularly portable mobile terminals.

2. Description of the Prior Art

In the last decade, considerable research and development effort has been made by the industry to offer mobile satellite services (MSS). The article by J. VENTURA-TRAVESET et al "Key Payload Technologies for Future Satellite Personal Communications: A European Perspective" (International Journal of Satellite Communications, Vol. 13, pages 117–135, March–April 1995) shows that even at the start of the new millenium terrestrial cellular communication networks will probably not cover more than 15% of the surface of the Earth. Mobile satellite services will therefore continue to be of interest.

These services can be divided into categories, according to the type of satellite used, in particular with reference to the altitudes of the orbits of the satellite constellations or with reference to the terrestrial coverage of the service.

The former classification usually distinguishes between satellites in low Earth orbit (LEO), medium Earth orbit (MEO), geostationary Earth orbit (GEO) and highly elliptical orbit (HEO).

The latter classification usually distinguishes between regional coverage systems and worldwide coverage satellites.

For the space segment, the invention uses geostationary satellites referred to hereinafter as "GEO" satellites for simplicity. It applies equally to regional coverage and worldwide coverage systems.

The terrestrial segment of the system includes mobile terminals (MT). These have various aspects. They include terminals on board vehicles or a mobile plant: land vehicles, sea vessels, aircraft, etc. They may also include hand-held portable terminals. These terminals are referred to hereinafter as "MT".

The architecture of the space and terrestrial segments of the system of the invention is described in more detail hereinafter.

When it is possible to use a geostationary satellite the communication system has obvious advantages, including:

- low technological risks, because of reliable experience of the usable orbit;
- simplified legal and administrative aspects;
- the possibility of regional coverage with a small number of spacecraft;
- simplified network control;
- minor Doppler problems and simplified spacecraft tracking subsystems;
- a small number of geostationary allocations is sufficient for worldwide coverage and usually a single allocation is sufficient for regional coverage, for example to cover Europe.

However, a system of this kind is not entirely free of problems or limitations, including:

- very high, or even excessive values of the equivalent isotropic radiated power (EIRP) or gain/temperature (GT) parameters of the mobile terminal (MT) when particularly unfavorable situations are encountered (for example, an environment with very marked shadow areas); the only alternative is to accept reduced availability of the service as a trade-off for acceptable values of the aforementioned parameters;
- excessively large satellite antennas or the need for a high-power satellite;
- long call time-delays that become more critical with the need to use complex codes and long interleaving and de-interleaving time-delays to destroy the inherent channel memory effect;
- very costly satellite launches for systems with low capacity mobile satellite services.

The above four limitations have to some degree powered the search for alternative solutions using satellites in lower (MEO or LEO) orbits for the type of applications at which the invention is directed. Although these alternative solutions have major technological problems compared to the geostationary satellite solutions, they nevertheless represent a better match to the intended application.

An aim of the invention is to alleviate the limitations of prior art communication systems using geostationary satellites whilst retaining the advantages of such systems. One particular aim of the invention is to improve uplink performance, i.e. the performance of the link from the terrestrial mobile terminal (MT) to the communication satellite.

The invention uses a spatial diversity technique for this. It uses at least one auxiliary satellite, also in geostationary orbit, associated with a main satellite. It is co-located on the same geostationary orbit at a distance that can be relatively small given the orders of magnitudes of the dimensions associated with these orbits. It preferably communicates over a microwave link, although this is not limiting on the invention in any way. The main satellite provides two-way communication with the terrestrial mobile terminals MT. The auxiliary satellite(s) provide only a directional uplink, i.e. their function is limited to receiving calls from the terrestrial mobile terminals MT. They can therefore be small, since the power required is much lower than that required for the main satellite, transmissions from which must cover a large area on the surface of the Earth. The additional launch cost associated with the auxiliary satellites is low in comparison with the main cost and the control procedures are simple to implement.

The principle of spatial diversity is well known in itself. It has been applied to satellite systems using lower (LEO or MEO) orbits.

It is beneficial to bear in mind that mobile satellite service channels are substantially different from conventional Additive White Gaussian Noise (AWGN) channels of fixed satellite services, in that there are shadow areas (due to obstacles blocking transmission) and multiple reflections in the immediate environment of the mobile terminal MT. Diversity techniques are used to combat these two unwanted effects.

The term "diversity" as used in the field of prior art communication systems, because of a lack of uniformity, covers concepts that can in practise be highly different: frequency diversity, time diversity, path diversity, elevation angle diversity, polarization diversity, orbital diversity, etc. The methods of implanting diversity receivers are also highly diverse, extending from the most simple to the most complex.

The prior art diversity systems applied to non-geostationary (LEO, MEO or intermediate circular orbit (ICO) satellites) use a plurality of satellites of the same type in different orbits. ICO type systems include the GLOBAL-STAR and IMMARSAT P-21 commercial satellite systems. The operation of a system of this kind is based on the statistical assumption that there is a high probability that one of the satellites of the constellation of satellites is in direct line of sight (LOS) of the terrestrial mobile terminal MT. This direct path (or "physical" communication channel) is necessarily the optimum path and this path is preferable to an "energy multipath" concept for enhancing the quality of communications.

Consideration might be given to applying this concept as such to GEO systems. However, such direct transposition would not solve the problems specific to this type of communication system and would in any event be difficult if not impossible to implement.

It is necessary to have at all times at least one satellite whose line of sight LOS to the terrestrial mobile terminal MT requiring to communicate is not blocked. It is therefore necessary to have a constellation of satellites, i.e. a large number of satellites, having different elevation angles and non-correlated lines of sight LOS.

It is obvious that extending this concept to GEO systems is not simple and is even unrealistic from the economic and/or technical point of view. The distance between GEO satellites would have to be very large, which would make the intersatellite links (ISL) very complex and would additionally require very powerful and therefore large satellites. Doubts may therefore be raised with respect to the performance of such systems, given the high time-delays due to the distance between the satellites. Finally, non-blocking of calls is not guaranteed, at least in all cases.

SUMMARY OF THE INVENTION

The invention therefore consists in a system for transmission of radio signals via a geostationary communication satellite in a particular orbit about the Earth, between at least one terrestrial station and at least one terrestrial mobile terminal, the system including bidirectional transmission links between said satellite and each of said terrestrial mobile terminals and bidirectional transmission links between said satellite and each terrestrial station, at least one auxiliary satellite "co-located" in said particular orbit and a transmission link between each of said terrestrial mobile terminals and each "colocated" auxiliary satellite and an intersatellite transmission link between each "co-located" auxiliary satellite and the geostationary communication satellite or main satellite, to form a spatial diversity communication system.

The invention will be better understood and other features and advantages of the invention will emerge from a reading of the following description with reference to the appended drawings.

BRIEF DESCRIPTION OF THE DRAWINGS

FIG. 1 illustrates the phenomena of shadow areas and multiple reflections in communications between a terrestrial mobile terminal and a communication satellite.

FIG. 2 is a diagram showing the architecture of the "space segment" of a geostationary satellite communication system of the invention.

FIG. 3 is a diagram showing the overall architecture of a geostationary satellite communication system of the invention, including the various components of the "ground segment" of the system.

DETAILED DESCRIPTION OF THE PREFERRED EMBODIMENT

One of the main objects is to improve the performance of a conventional GEO type system, in particular to eliminate shadow area problems; it is therefore useful to describe these phenomena briefly.

FIG. 1 illustrates the main phenomena encountered in communications between a terrestrial mobile terminal $MT_1$ and a geostationary satellite (not shown).

As explained hereinafter, the invention essentially concerns the transmission links referred to as "uplinks" in the preamble to this description, and only this type of transmission link is shown in FIG. 1.

It is assumed that the terrestrial mobile terminal is mounted on an automobile vehicle $V_1$. It is also assumed that the immediate environment of the vehicle is an urban type environment. Generally speaking, this type of environment generates the most problems due to the presence of many obstacles: buildings $O_{b1}$, $O_{b2}$ through $O_{bx}$, trees $O_{by}$, other moving or stationary vehicles $V_2$, etc. As the vehicle $V_1$ moves around, these various obstacles may at any time block all or part of the radiation transmitted by the terminal $MT_1$ or create multiple reflections.

To illustrate the aforementioned phenomena, FIG. 1 shows five rays $b_1$ through $b_5$ of the radiation transmitted from the antenna Ant of the terminal $MT_1$. The first ray $b_1$ is entirely intercepted by a high building: obstacle $O_{b1}$. The second ray $b_2$ is refracted by the upper edge of the same building $O_{b1}$. The refracted ray $b'_2$ can be transmitted to the communication satellite (not shown) if it is within the acceptance angle of the transmission link lc, shown diagrammatically by the shaded area in FIG. 1. The ray $b_3$ is reflected and/or diffused by a belt of trees, obstacle $O_{by}$. This ray is reflected and/or diffused by this obstacle $O_{by}$ to produce a ray $b'_3$. The ray $b_4$ is reflected by a mobile obstacle, the vehicle $V_2$, to produce a ray $b'_4$. The ray $b_5$ suffers multiple reflection from a set of buildings: obstacles $O_{b2}$ and $O_{b3}$, producing the reflected rays $b'_5$ and $b''_5$.

This simple example shows that the radiation energy transmitted towards the satellite (transmission link lc) can vary at random over a wide range depending on an environment that cannot be controlled and on the movement of the vehicle $V_1$ carrying the terminal $MT_1$. The amplitude of the radiation finally transmitted to the satellite also varies at random, although it is conditioned by the distance between the obstacles and the terminal $MT_1$.

One embodiment of a GEO type satellite communication system of the invention will now be described with reference to FIGS. 2 and 3.

FIG. 2 shows the space segment of the geostationary satellite communication system and FIG. 3 shows the system as a whole, including the various components of the ground segment.

The main characteristics of a communication system using the principle of spatial diversity is that it uses a single transmit antenna and a plurality of receive antennas. The paths between the transmit antenna and each receive antenna are known as "diversity channels". There are therefore as many "diversity branches" as there are diversity receive antennas. To take full advantage of the benefits of diversity, the distance between receive antennas must be sufficient for the multipath at the entry of each diversity branch to be statistically independent.

As FIG. 1 suggests, the multiple reflection and/or diffusion and the blocking of the radiation by fixed or moving obstacles constitute the major cause of deterioration of the uplink expressed in terms of the bit error rate (BER), which is not the case with conventional additive Gaussian white noise (AGWN) transmission links (fixed services).

As already mentioned, applying the diversity concept of the prior art to GEO systems would appear to be unrealistic for economic and/or technology reasons.

However, if it is accepted that the problem of shadow areas cannot be entirely solved, it is nevertheless possible to optimize the power available to the receiving satellite by having the system take full advantage of the available "multipath" energy, which constitutes the second largest energy component and is the predominant component in the energy balance at the satellite entry for serious shadow area situations.

The invention exploits these properties. This makes it possible to use a spatial diversity system that does not have the drawbacks previously pointed out.

It is then sufficient to have one or more diversity satellite receivers (DSR) at a short distance from the main satellite (MS). In the context of the invention, the concept of a "small" distance means small relative to the distance between the terrestrial mobile terminals and the satellite MS, which is approximately 36,000 km. It will be shown hereinafter that an intersatellite distance of about 200 km to 400 km is required to achieve the stated objects of the invention, and this is a small distance in comparison with 36,000 km. This distance enables a sufficient degree of non-correlated "multipath" signal, regardless of the position of the terrestrial mobile terminal MT and its signal fading environment. The DSR satellite(s) and the MS satellite can therefore be regarded as "co-located".

In the embodiment of the system of the invention shown in FIG. 2 there is one main satellite MS and two diversity satellite receivers $DSR_1$ and $DSR_2$, one on each side of the satellite MS and travelling around the Earth T in the same geostationary orbit $O_G$. The satellite MS communicates with the terminal MT via a downlink $l_{d0}$ and an uplink $l_{m0}$. In a preferred embodiment the satellites $DSR_1$ and $DSR_2$ communicate with the terminal MT only via respective uplinks $l_{m1}$ and $l_{m2}$, since they are only receiver satellites. As already mentioned, the distances between the satellite $DSR_1$ and the satellite MS and between the satellite $DSR_2$ and the satellite MS are typically in the range from 200 km to 400 km. The satellites $DSR_1$ and $DSR_2$ communicate with the satellite MS via respective unidirectional transmission links $l_{10}$ and $l_{20}$.

Ignoring all other considerations (simplification of frequency coordination, etc), the fact that the satellites are colocated, in the sense explained above, very greatly simplifies the requirements associated with the routine operation of the multisatellite system: a single ground station can control the three satellites and the three satellites (or, more generally, all of the satellites) can be placed in orbit by the same launch vehicle, which reduces launch costs, etc. Another advantage of this proximity is that since the diversity satellite receivers $DSR_1$ and $DSR_2$ do not need to transmit to a ground control station only intersatellite transmission links are provided. This greatly reduces the power requirement and therefore allows a reduction in the weight of the satellites, which in turn enables more satellites to be carried by the same launch vehicle or alternatively the use of a less powerful launch vehicle. Finally, the intersatellite transmission links can be implemented without major problems in any frequency band (for example the Ka band). Because of the close proximity of the main satellite MS and the diversity satellite receivers $DSR_1$ and $DSR_2$, there are no interference problems and no pointing problems. The power requirements of these satellites are low, as already mentioned. The satellites can therefore be small in size.

It must nevertheless be clearly understood that, although it is one of the main features of the invention that only the uplinks are indispensable, the system is nevertheless compatible with the co-existence of downlinks for some or all of the diversity satellite receivers. This enables more flexible reconfiguration of the space segment of the system, in particular in the event of failure of the main satellite MS. A greater onboard power capability would naturally be required in this case, thus increasing the weight of the satellite. The proximity feature, with its attendant advantages, nevertheless remains.

FIG. 3 shows the overall architecture of the system including the main components of the ground segment.

The ground segment typically comprises the components mentioned hereinafter.

It firstly comprises a first subsystem made up of the terrestrial mobile terminals $MT_u$. In the context of the invention, the word "terrestrial" has its widest meaning. It may refer to terminals on land vehicles, ships or aircraft and portable terminals carried by persons. Even in the case of aircraft, the mobile terminals remain a distance from the surface of the Earth that is small relative to the distance between the latter and the satellites. The terminals can also be of different sizes and offer different levels of performance. To give a more concrete example is it assumed that all the terminals transmit in a narrow band (although the invention applies equally well to wide band transmission) and use an appropriate conventional access scheme: e.g. FDMA (frequency-division multiple access) or TDMA/ FDMA (TDMA=time-division multiple access). It is further assumed that transmission utilizes a particular channel code (forward error correction—FEC) and a particular kind of modulation, for example M-ary Phase Shift Keying (M-PSK). Transmission and reception are typically in the L or S band. The types of signal transmitted usually include voice and data at a bit rate of a few kbit/s (typically in the range 4 kbit/s to 10 kbit/s). Finally, the expression "mobile terminal channels" (MTC) refers hereinafter to all of the channels for transmission of user data from a mobile terminal MT.

The second subsystem comprises a terrestrial mobile services station $ST_1$. This provides a direct bidirectional communication link $l_{bi}$ between the main satellite MS and various terrestrial communication networks $R_T$. For these networks $R_T$, which may comprise private and/or public telephone networks, the station $ST_1$ is usually a transit node and international traffic terminal station for users (terrestrial mobile terminals $MT_u$) connected via the GEO communication satellites. The mobile terminal channels (MTC) are transmitted via the "return" transmission link, which comprises the uplink(s) to the main satellite and/or the diversity satellite receivers and the downlink of the bidirectional direct transmission link $l_{bi}$. Likewise, the station channels from the station $ST_1$ use the "out" channel which comprises the uplink of the bidirectional direct transmission link $l_{bi}$ and the downlink of the satellite(s).

A third subsystem comprises the various terrestrial stations $ST_2$. The latter comprise a master control station (MCC) for the various satellite control stations (SCS) and the network control station (NCS), telemetry stations, etc. These stations are well known to the person skilled in the art and are outside the scope of the invention. There is therefore no point in describing them further. The term "satellites" refers both to the main satellite MS and to the diversity satellite receiver(s), e.g. $DSR_1$.

The space segment typically comprises the components mentioned hereinafter. For simplicity, in the example described there is only one diversity satellite receiver $DSR_1$. It communicates with the satellite MS via a unidirectional intersatellite transmission link $l_{10}$.

The first subsystem comprises the main satellite MS. This satellite MS has "out" and "return" links, i.e. "uplinks" and "downlinks" for communicating with all the terrestrial mobile terminals $MT_u$. These links are grouped under the single reference numbers $l_{m0}$ for the uplinks and $l_{d0}$ for the downlinks and there is of course a pair of separate transmission links for each terminal.

The main satellite MS has conventional beam shaping, routing and switching functions that do not differ from the similar functions usually encountered on GEO type satellites for mobile satellite services (MSS). It has additional functions specific to the invention, however. In particular, it is necessary to provide specific circuits for the intersatellite transmission link $l_{10}$ or, more generally, the intersatellite transmission links (satellite $DSR_1$ to satellite MS in the example described) referred to hereinafter as "intersatellite link receive units". It will usually be necessary to provide additional routing and mapping capacity for diversity channels from the intersatellite communication link(s). Finally, in one embodiment of the invention, the direct channels and the channels from the diversity satellite receiver(s) (e.g. $DSR_1$) are combined on board the main satellite MS. It is therefore necessary to provide dedicated circuits offering this possibility of combining diversity branches.

In accordance with one of the more important aspects of the invention, the second subsystem comprises at least one co-located spatial diversity satellite receiver. In the example described there is only one such satellite $DSR_1$. More generally, there can be several, for example two disposed on opposite sides of the main satellite MS. As already mentioned, the spatial diversity satellite receivers such as the satellite $DSR_1$ are small "co-located" satellites, i.e. typically between 200 km and 400 km from the main satellite MS. They procure spatial diversity reception for the multipath signal from the terrestrial mobile terminals $MT_u$. To simplify the administration of the system of the invention, in one particular embodiment the satellite and network control ground stations $ST_2$ can also have access to these satellites. In a simplified embodiment of the system the spatial diversity satellite receivers use their transmission energy only to communicate with the main satellite MS. The satellite $DSR_1$ (more generally, the spatial diversity satellite receivers) is sufficiently far from the main satellite MS to guarantee that the diffuse components of the multipath signals received are not correlated in the two satellites (MS and $DSR_1$), with the result that the spatial diversity capacity is used correctly, as will be shown hereinafter.

In addition to land and space segments, the system includes a number of communication links.

The first type of link is the "return link".

These are, firstly, the uplinks $l_{m0}$ between the terrestrial mobile terminals $MT^u$ and the main satellite MS and $l_{m1}$ between the same terminals $MT_u$ and the diversity satellite receiver $DSR_1$ (or, more generally, the diversity satellite receivers). This communication link is of primordial importance in the context of the invention. It is essentially this link that makes it possible to achieve the stated objectives of the invention.

Next is the downlink of the bidirectional transmission link $l_{bi}$ between the main satellite and the mobile service station (s) $ST_1$. It must be clear that it is only mandatory for the main satellite and this station to be able to communicate. The links between the station $ST_1$ and the diversity satellite receivers, e.g. $DSR_1$, are entirely optional and do not exist in the simplified version of the system of the invention.

This communication link can be considered as a conventional communication link as used in prior art systems. Communications are affected only by additive Gaussian white noise (AGWN) and are not usually considered critical in the case of GEO mobile satellite services (MSS).

The second type of link is the "out" link.

This means, firstly, the uplink of the bidirectional link $l_{bi}$ between the mobile service station(s) $ST_1$ and the main satellite MS. Note that no uplink is needed between the station $ST_1$ and the satellite $DSR_1$ (or, more generally, the spatial diversity satellite receivers).

This communication link can also be considered as a conventional communication link that is present in prior art systems. Communications are affected only by additive Gaussian white noise (AGWN) and are not usually regarded as critical in the case of GEO satellites for mobile satellite services (MSS).

The next is the uplink of the bidirectional transmission link $l_{bi}$ between the mobile service station(s) $ST_1$ and the main satellite MS. Note that there is no communication link of this type between the satellite $DSR_1$ (or, more generally, the spatial diversity satellite receivers) and the station $ST_1$.

Once again this is a conventional communication link meeting the requirements usually encountered in GEO satellite systems for mobile services.

Finally, the third type of link, also specific to the invention, is the intersatellite link, more particularly the link(s) between the diversity satellite receiver(s), e.g. $DSR_1$, and the main satellite MS.

In the example shown in FIG. 3 the communication link $l_{10}$ is set up between the satellite $DSR_1$ and the satellite MS. The signals received by the two satellites from the terrestrial mobile stations $MT_u$ are combined either on board the main satellite MS (first embodiment) or subsequently, on the ground, after retransmission by the main satellite MS to the station $ST_1$ (second embodiment).

The main components of the system having been mentioned and described in outline, the operation of the system will now be described in more detail. To give a more concrete example, only the simplified version shown in FIG. 3 is referred to in what follows: a single colocated diversity satellite receiver $DSR_1$ and no communication link between this satellite and the ground, it being clearly understood that this particular architecture is not limiting in any way on the scope of the invention. Similarly, the management of the system and the particular control and command systems will not be described as they are outside the scope of the invention and are well known in themselves to the person skilled in the art.

In accordance with the invention, from the point of view of a user of a terrestrial mobile terminal $MT_u$, portable or otherwise, the use or non-use of one or more diversity satellite receivers is "transparent". The user communicates with the system of GEO satellites in accordance with a specified transmission access, modulation and coding scheme, for example a narrow band scheme using the FDMA, TDMA or F/TDMA technique. This scheme is not in any way imposed by or limited by the invention.

Because of multiple reflections (see FIG. 1) the information transmitted by a terrestrial mobile terminal $MT_u$ over the satellite channel is received via separate paths by the satellites MS and $DSR_1$ colocated in the same geostationary orbit. The distance between these two satellites is typically in a range from 200 km to 400 km, depending on the specific parameters of the system concerned. This distance guarantees a sufficient degree of statistical non-correlation between the signals received by the satellite MS and the signals received by the satellite $DSR_1$ so that the benefits of spatial diversity are obtained.

A diversity antenna on the satellite $DSR_1$ receives the multipath mobile terminal channel (MTC) with a corresponding gain/temperature (G/T) ratio. After any beam shaping operation that may be necessary, the received multipath signal is passed to a conventional system of radio frequency circuits for amplification and conversion to the frequency of the intersatellite communication link $l_{10}$. These signals are then transmitted to the main satellite MS on this frequency via conventional transmission circuits (intersatellite transmission link unit ISLTU, not shown in FIG. 3).

An antenna on the main satellite MS receives the multipath mobile terminal channel (MTC) with a corresponding gain/temperature (G/T) ratio. Because of the co-location of the satellites MS and $DSR_1$, the receive antennas on the two satellites can be of identical design (in terms of coverage and radiation pattern). The satellite MS also receives via the intersatellite transmission link $l_{10}$ the part of the multipath signal picked up by the satellite $DSR_1$ (which constitutes a non-correlated branch). These diversity signals are received by an intersatellite link receive unit (ISLRU) not shown in FIG. 3. At this stage the direct signals received by MS and the diversity signals received by $DSR_1$ must be combined into a single signal. The invention can do this in two ways:

1. Combination of the signals on the ground: this solution is the simpler one, in terms of the complexity of the onboard circuits. The two signals are retransmitted separately by the "return" transmission link (the downlink part of the bidirectional transmission link $l_{bi}$) and are combined on the ground in the station $ST_1$. Various combination techniques may be used in the latter station: for example, maximal ratio combination (MR-C), equal gain combination (EGC) or selection combination (SC). These techniques are explained in "Microwave Mobile Communication" by W. C. Jackes, John Wiley & Sons, 1974, to which reference may usefully be had for a more detailed description of these conventional techniques. It must be clearly understood that the invention is not tied to any particular technique.

This mode of combination on the ground is well suited to all situations in which the transmission link $l_{bi}$ is not subject to severe bandwidth constraints, since this approach implies that the bandwidth is proportional to the "diversity order", i.e. in the final analysis to the number of diversity satellite receivers DSR. Conversely, it must be noted that in this case the onboard signal processing is limited to the usual processing carried out in the case of conventional GEO satellites: beam shaping, routing and switching. The only additional circuits necessitated by the invention are the previously mentioned ISRLU circuits and additional circuits for routing/mapping diversity signals to the return link (the downlink part of $l_{bi}$) This approach enables very simple synchronization of the satellites MS and $DSR_1$ since the direct and diversity mobile terminal channels $MT_u$ are combined and synchronized on the ground.

2. Combination of the signals on board the satellite MS: in this case the direct multipath signals and the diversity multipath signals are combined on board. There are again two main ways to do this:

a) Combination at the intermediate frequency (IF): this approach requires that, for each diversity branch, each individual mobile terminal channel $MT_u$ received is, after a back-conversion and beam shaping operation, filtered in the time or frequency domain and isolated from the other signals from the other users. They are then passed to IF combination circuits. In these circuits all the signals from the various diversity branches are combined (before demodulation) using a particular approach, for example selection combination or differential reception combination. Once again, it must be clearly understood that the invention is not tied to any particular combination technique. Once the combination operation has been completed, the signals combined in this way follow the conventional path of signals in a prior art GEO satellite. The combined signals can be considered as normal signals received by the satellite MS and retransmitted to the ground (station $ST_1$), also in the conventional way.

The circuits are more complex since they include the previously mentioned ISLRU circuits, the radio frequency routing circuits for filtering and isolating the mobile terminal channel and the processor effecting the IF combination.

Note that in this case the requirements for the transmission link to the ground do not differ in any respect from those in the prior art systems, i.e. systems without diversity. The same applies to the installations on the ground, since the combination is carried out on the satellite MS.

Conversely, synchronization of the main satellite MS and the diversity satellite receivers, e.g. $DSR_1$, is needed to guarantee that the combination process is carried out synchronously, as explained hereinafter.

b) Combination in the baseband: this approach is ideal for a regenerator GEO satellite. In this case the direct or diversity (from $DSR_1$) mobile terminal channels $MT_u$ are demodulated and combined in the baseband after demodulation but before decoding. In this case any combination method may be used.

The additional circuits required (compared to a prior art GEO satellite without diversity) are as follows: the ISLRU circuits previously referred to, circuits for diversity routing, additional demodulators for the diversity channels and a combination processor.

Once again, the bidirectional transmission link $l_{bi}$, and in particular its downlink, are conventional and the demodulators of the terrestrial station $ST_1$ do not require any additional circuitry. Conversely, synchronization between the main satellite MS and the diversity satellite receivers, e.g. $DSR_1$, is necessary.

The requirements relating to the intersatellite transmission links, for example the transmission link $l_{10}$ in the example described, will now be explained in more detail.

Extensive simulations have been carried out. On this basis, it is possible to demonstrate that the statistical properties of the signal transmitted by the user of a terrestrial mobile terminal $MT_u$ and propagated other than by a direct line of sight with each of the satellites are very highly decorrelated if the following conditions are satisfied:

the satellites are spaced by approximately 250 km to 300 km;

the terrestrial mobile terminal $MT_u$ is located in an urban environment favoring diffusion of the radiation; and transmission is effected in the L frequency bands.

If has been found that the decorrelation remains sufficient for intersatellite distances less than 150 km in some urban environments, and much higher for suburban and rural environments.

A return uplink in the S frequency band, or at even higher frequencies, reduces the intersatellite distance required to achieve a degree of decorrelation of the indirect return paths for given users in a diffusing environment.

The short distances between the main satellite MS and the auxiliary diversity satellite receivers, for example the satellite $DSR_1$, in combination with the fact that these are GEO type satellites, enables the use of a particularly simple and low-power intersatellite link, for example the link $l_{10}$. The implantation constraints are merely those required by any transmission link using modern technology and do not differ in any way from the prior art.

Satellite station keeping to within ±0.05° (relative to the North and South directions, on the one hand, and the East and West directions, on the other hand) has become the norm. This implies a minimal intersatellite distance of 250 km and a maximal intersatellite distance of 400 km. In this case compact antennas of well-known design can be used for transmission from the subsidiary satellites (e.g. $DSR_1$) and reception on the main satellite MS. A minimum gain of 25 dBi in the direction of the companion satellite can be obtained without electrical or mechanical steering of the antenna. An antenna aperture smaller than 20 cm by 5 cm is appropriate for the frequency bands allocated for satellite communications around 23 GHz.

The calculation of the intersatellite transmission link must allow for the fact that the sun shines for an essential part of the day on the main beam receive antenna but where the receive antennas of the intersatellite link are concerned the temperature can drop to values below 170 K. This leads to auxiliary satellite (e.g. $DSR_1$) radio frequency transmit powers of less than 1.4 W/MHz of bandwidth of the intersatellite link. Noise and the intermodulation product produce negligible deterioration of the overall service of the "return" transmission link (the cumulative levels of interference of the intersatellite link are at least 20 dB below the signals on the "return" transmission link). The outermost diversity satellite receivers in a system utilizing more than three operational satellites (which constitutes an extreme case of the system of the invention) require either slightly oversized antennas (which is the preferred choice from the point of frequency coordination) or transmission of signals at higher power levels. Neither of these approaches gives rise to particular problems, given the current state of the technology.

To summarize, low weight (in terms of the equipment employed: antennas, etc) intersatellite links can be used and make use of all the appropriate frequency band to support the planned transmission link capacity. This capacity depends on the frequency spectrum allocated to terrestrial mobile terminal users and the degree of frequency re-use established for the system. Frequency coordination is particularly simple with LEO spacecraft since they are typically located at more than 70° from the lines of sight of the antennas of the diversity satellite receiver system of the invention and therefore highly discriminated. GEO type satellites forming data relays are calculated for communications with LEO type users and do not normally give rise to frequency coordination problems.

It must be noted that the use of the spatial diversity concept is independent of the existence of intersatellite transmission links, but it is clear from the foregoing description that the use of these transmission links is particularly simple. Although "co-located" in the sense that the space segment occupies less than one degree of arc on the geostationary orbit, the satellites cannot be confused with a single geostationary satellite. Nevertheless, frequency allocation does not raise any serious problems.

The use of intersatellite transmission links procures the following improvements:

1. For the system implementer it is necessary to coordinate with other administrations only the downlinks of a single satellite.

2. The main terrestrial coverage of the auxiliary satellites, e.g. $DSR_1$, can be of the "receive only" type, which enables either miniaturization or the freeing up of extra capacity for other applications.

3. The use of an intersatellite transmission link enables the installation of a standardized diversity receiver (NORD) conforming to the architecture proposed in "Normalized Diversity Receiver for Mobile Fading Channel" by J. Ventura-Traveset et al published in Proceedings of the Cost 229 Workshop on Adaptive Systems, Intelligent Approaches, Massively Parallel Computing and Emergent Techniques in Signal Processing and Communications, Bayona(vigo), Spain, October 1994.

As previously indicated, many simulations have been carried out to establish the validity of the assumptions on which the invention is based and to highlight the advantages of the invention as compared to GEO type mobile services systems of the prior art.

Use has been made of one of the most widely accepted transmission evaluation systems, namely the one proposed in "A statistical model for a land mobile satellite link" by C. Loo published in IEEE Transactions on Vehicles Technology, vol 34, page 127, August 1985. This is a generic statistical system.

To be more specific, three scenarios were considered in order to cover the requirements of the invention:

1. A very strongly "masked" channel.
2. A moderately "masked" channel.
3. A weakly "masked" channel.

These models describe various masking situations and therefore various distributions of energy, both for disperse (multipath) transmission and direct line of sight transmission.

The hoped for degree of decorrelation on the transmission paths of non-direct (multipath) signals was evaluated using a method similar to that described in the previously mentioned "Microwave Mobile Communication" by W. C. Jackes, John Wiley & Sons, 1974.

Refer again to FIG. 1, which is a diagram showing an urban environment generating multiple diffusions and reflections in a random manner. A previously explained, this figure clearly shows the influences of the various sources of dispersion and diffusion of the signals transmitted by the antenna Ant of the terrestrial mobile terminal $MT_1$. The number of obstacles was 20 and several thousand environment configurations were generated statistically, using the Monte Carlo method.

One typical example of the results of such simulation is given in TABLE I at the end of this description.

These results clearly show that for an urban environment, using the L band or higher frequencies, an intersatellite distance of 300 km is sufficient for adequate decorrelation of the diversity paths. The theory predicts that even better results will be obtained by using S band. Finally, the simulations also showed that the decorrelation is improved in a suburban or rural environment, which also agrees with the theory.

The choice of an urban environment and L band provides a sufficient safety margin in the calculation of the minimal intersatellite distance. As it is easy to obtain satellite orbits that comply with this separation of 300 km and the latter corresponds to the inter-orbital link requirements offering the best performance, this distance is adopted in a preferred embodiment of the system of the invention.

The normalized diversity receiver (NORD) concept has been used to estimate the overall performance of the diversity communication system of the invention. For a more detailed description of this concept, reference may usefully be had to the previously mentioned article by J. Ventura-Traveset et al.

Also, as has been mentioned, the invention does not impose in any way the type of receiver to be used. Tests have been carried out with various designs of receiver architecture, including those corresponding to a coherent receiver, a differential receiver and a pilot frequency receiver.

Various communication techniques can be used: the invention has been tested for quaternary phase shift keying (QPSK) and 2/3 TCM 8-PSK (trellis coded modulation with 8-state Underboeck codes of the phase shift keying type). These transmission techniques were selected because they cover two different transmission strategies and have been proposed for mobile transmission services based on GEO type satellites, in particular in "Satellite communications: mobile and fixed services" by M. J. Miller et al, Kluwer Academic Publishers, 1993.

Finally, a number of assumptions were made and working hypotheses adopted to cover the more usual situations of transmission conditions in the preferred application of the invention: a mobile communication service. Among these, bit error rates between $10^{-2}$ and $10^{-5}$ have been considered, being rates that cover most of the usual requirements for this type of application.

Systematic comparative tests have been carried out for these various assumptions with a prior art conventional GEO satellite communication system and a system of the invention using space diversity and a single "colocated" auxiliary satellite.

To provide a more concrete example, TABLES II through IV at the end of the description show the performance improvements over a conventional system procured by the system of the invention.

To be more precise, TABLES II through IV cover the three scenarios previously mentioned: very highly "masked" channels, moderately "masked" channels and weakly "masked" channel, respectively. The NORD concept previously referred to was used together with a coherent detection receiver architecture. Finally, the direct and diversity signals were combined using the "maximal rate" technique. In each table the first column gives the bit error rate (BER), the second column covers the non-coded QPSK transmission technique and the third column covers the 2/3 TCM 8-PSK transmission technique.

In the second and third columns, for each value of BER the performance improvement offered by the system of the invention over a conventional system operating under the same conditions but without any diversity satellite is given in dB.

Note that in the three environments, and in particular in the highly penalizing urban environment, the system of the invention procures a very substantial improvement in performance. Note that, especially if low bit error rates are required, the improvement is more than 20 dB for an urban environment and at least 16 dB in the other two cases. These values correspond to the non-coded QPSK transmission technique.

An improvement is also noted for the 2/3 TCM 8-PSK transmission technique, although the improvement is less marked.

Finally, although the corresponding results have not been set out in specific tables, comparable results were obtained with a differential detection receiver architecture and a differential combination, on the one hand, and with a pilot frequency receiver architecture and quasi-maximal combination.

In all cases, and in particular regardless of the transmission techniques or the type of receiver considered, the system of the invention offers an improvement in performance compared to a conventional GEO satellite communication system.

As has been mentioned, the system of the invention can include a plurality of diversity satellite receivers which on the face of it increases performance. TABLE V at the end of the present description sets out a comparison between a conventional system and a system of the invention respectively comprising one diversity satellite receiver (column 2) or two diversity satellite receivers (column 3), for bit error rates varying between $10^{-2}$ and $10^{-5}$. The environment is an urban environment, the transmission technique is non-coded QPSK, the receiver is of the coherent detection type and the combination is of the maximal rate type. Under these conditions, the values set out in the second column of TABLE II are obtained, indicating the performance improvement procured by a second diversity satellite receiver ($DSR_2$ in FIG. 2). Expressed in dB, the improvement is 1.4 dB for a bit error rate of $10^{-2}$ to approximately 5 dB for a bit error rate of $10^{-5}$. It is approximately 3 dB for a mean bit error rate of $10^{-3}$. The improvement procured by a second satellite can be substantial in some applications.

Another important parameter to be considered in all satellite communication systems is its capacity, i.e. in concrete terms the maximum number of users that can be processed simultaneously. It is well known that the available frequency spectrum for a satellite offering mobile satellite services is a very scarce resource. It is therefore necessary to be able to count on a high frequency re-use (FR) factor. It is also necessary to minimize the required bandwidth of a single channel and the separation between adjacent channels. Many studies have been undertaken and certain solutions have been implemented in prior art systems: appropriate modulation format ($\pi/4$ QPSK, for example), beam forming networks (DBFN) using Butler matrices, etc.

Regardless of the solution adopted, it has been shown that the capacity of the channel subject to fading is very highly dependent on the channel interference values. The system of the invention, employing spatial diversity, represents a fundamental improvement over conventional GEO systems in this area also.

For example, TABLE VI at the end of the present description highlights the performance improvements procured by a system of the invention using one diversity satellite receiver compared to a conventional GEO satellite system affected by carrier interference in the same channel (co-channel interference), for bit error rates running from $10^{-2}$ to $10^{-5}$. This table has four columns, columns 2 and 3 representing signal interference rates (SIR) of 25 dB, 30 dB and 40 dB, respectively.

The previously mentioned NORD concept was used, the receiver architecture was of the coherent detection type, direct and diversity signals were combined using the "maximal rate" technique and the transmission technique was non-coded QPSK. The environment considered was of the urban type, i.e. highly "masked".

An improvement in performance was noted in all cases. The symbol "$\infty$" means that, with a conventional GEO system, the bit error rate (BER) indicated in the first column cannot be achieved. This means that the systems of the invention lowers the minimal value of the bit error rate that it is possible to achieve.

Furthermore, the carrier to noise ratio (C/N) on the transmission link is greatly improved.

The capacity of the system can therefore be increased. For example, it is found that in the case of a system of the invention, for an SIR value of only 25 dB, performance is improved over an SIR value as high as 40 dB in the case of a conventional GEO system. In other words, it is possible to reduce the SIR to 25 dB in the system of the invention while still obtaining improved performance in terms of the carrier to noise ratio (C/N). The capacity of the system can therefore be increased, or the number of beams can be substantially reduced (increase in the previously mentioned FR factor).

A certain number of simplifying hypotheses were adopted in the foregoing description, in particular that the interleaving was ideal, which is naturally not the case under real conditions of use. The depth of interleaving is necessarily finite. A major reason for this state of affairs is that interleaving and de-interleaving introduce an additional time-delay into the transmission, which can be undesirable.

Once again the system of the invention contributes an improvement, under similar conditions of use, compared to a conventional system, and is seen to be less critical in regard to problems of this kind.

To illustrate the behavior of the system of the invention, tests have been carried out in the case of a Rayleigh channel, although similar results can be obtained with different situations relating to mobile service channels. The transmission technique used was of the 2/3 TCM 8-PSK type previously referred to. The system included a single "co-located" diversity satellite receiver.

TABLE VII at the end of the present description sets out comparative results obtained for two bit error rate values ($10^{-2}$ and $10^{-3}$, respectively) and for four values of interleaving: I=0, I=10, I=20, I=30, respectively.

It can be seen that the performance of the system of the invention is superior to that of a conventional system in all cases. Furthermore, the greater the depth of interleaving, the better the improvement in performance. In other words, the effects of a finite interleaving depth have less impact on a system of the invention that on a conventional GEO system.

It is obvious from a reading of the foregoing description that the invention achieves the stated objectives.

It has been shown that the system of the invention has many advantages over prior art GEO type satellite systems, including the advantages summarized hereinafter:

1. A substantial improvement of the "return" transmission link in terms of the carrier to noise ratio (C/N) for severe signal fading conditions. The reduction of this ratio can be used for any of the following purposes or any combination of them:

reducing the size of their on board antennas;

increasing the availability of the system and the signal fading margins;

reducing the equivalent isotropic radiated power (EIRP) of the terrestrial mobile terminals;

using simpler coding schemes without compromising the performance of the system, and therefore in particular with reduced redundancy (which leads to a correlative increase in the capacity of the system) and reduced interleaving depth requirements (and therefore short additional time-delays also).

2. A further improvement in terms of reducing the carrier to noise ratio (C/N) if system interference is taken into consideration (for example co-channel interference and adjacent channel interference). This substantial reduction in the C/N ratio previously referred to can be used to achieve the following aims, individually or in combination:

increasing the frequency re-use factor FR of the system, i.e. increasing the capacity of the GEO satellite system, with a correlative increase in the return cost of the satellite;

reducing the number of beams without reducing the capacity of the system, through a substantial simplification in the "hardware" part of the satellite (circuits, etc), which also leads to a reduction in cost.

3. For all specific code and channel situations, the system of the invention enables a reduction in the depth of interleaving required and therefore a correlative reduction in transmission times.

4. The mobile service system makes performance more uniform since it is the most effective in the situation of the least favorable channels.

It must nevertheless be clearly understood that the invention is not limited to the embodiments specifically described, in particular those described with reference to FIGS. 2 and 3.

In particular, as has been mentioned, the invention in itself does not apply any limitation to the type of receiver used, the coding scheme and/or the transmission technique. Any frequency bands and bandwidths can be used appropriate to the intended application. There is no theoretical limit on the number of "colocated" auxiliary satellites, the only limitations resulting from practical and cost considerations. In a simplified embodiment (FIG. 3) a single diversity satellite receiver ($DSR_1$) is used; in a preferred embodiment two satellites ($DSR_1$ and $DSR_2$) are used, one on each side of the main satellite MS, in the same geostationary orbit OG (FIG. 2). As has also been mentioned, although the diversity satellite receivers, for example the satellite $DSR_1$, require only the uplink from the terrestrial mobile terminal $MT_u$ to the satellite $DSR_1$ and a unidirectional intersatellite link to the main satellite MS, additional transmission links can be provided without departing from the scope of the invention.

TABLE I

| Intersatellite distance (in km) | Correlation (L band) | Correlation (S band) |
|---|---|---|
| 200 | 0.5 | 0.24 |
| 300 | 0.3 | 0.13 |
| 400 | 0.13 | 0.13 |
| 500 | 0.13 | 0.08 |

TABLE II

| BER | Non-coded OPSK | 2/3 TCM 8-PSK |
|---|---|---|
| $10^{-2}$ | 5.8 dB | 2.7 dB |
| $10^{-3}$ | 10.3 dB | 4.2 dB |
| $10^{-4}$ | >15 dB | 5.6 dB |
| $10^{-5}$ | >20 dB | >7.5 dB |

TABLE III

| BER | Non-coded OPSK | 2/3 TCM 8-PSK |
|---|---|---|
| $10^{-2}$ | 2.9 dB | 1.3 dB |
| $10^{-3}$ | 7.0 dB | 2.2 dB |
| $10^{-4}$ | >12 dB | 3.3 dB |
| $10^{-5}$ | >17 dB | >5 dB |

TABLE IV

| BER | Non-coded OPSK | ⅔ TCM 8-PSK |
|---|---|---|
| $10^{-2}$ | 2.2 dB | 1.0 dB |
| $10^{-3}$ | 6.1 dB | 1.7 dB |
| $10^{-4}$ | >11 dB | 2.7 dB |
| $10^{-5}$ | >16 dB | 3.5 dB |

TABLE V

| BER | 1 DSR | 2 DSR |
|---|---|---|
| $10^{-2}$ | 5.8 dB | 7.2 dB |
| $10^{-3}$ | 10.3 dB | 13.2 dB |
| $10^{-4}$ | >15 dB | >19.5 dB |
| $10^{-5}$ | >20 dB | >25 dB |

TABLE VI

| BER | SIR = 25 dB | SIR = 30 dB | SIR = 40 dB |
|---|---|---|---|
| $10^{-2}$ | >20 dB | 7.2 dB | 5.5 dB |
| $5\;10^{-3}$ | ∞ dB | 11.4 dB | 7.3 dB |
| $10^{-3}$ | ∞ dB | ∞ dB | 12.3 dB |
| $5\;10^{-4}$ | ∞ dB | ∞ dB | ∞ dB |
| $10^{-4}$ | — | ∞ dB | ∞ dB |
| $5\;10^{-5}$ | — | ∞ dB | ∞ dB |
| $10^{-5}$ | — | — | ∞ dB |

TABLE VII

| BER | I = 0 | I = 10 | I = 20 | I = 30 |
|---|---|---|---|---|
| $10^{-2}$ | 8.2 dB | 4.6 dB | 3.7 dB | 3.3 dB |
| $10^{-3}$ | 9.5 dB | 6.4 dB | 5.1 dB | 4.6 dB |

There is claimed:

1. A system for transmission of radio signals comprising; a geostationary communication satellite in a particular geostationary orbit about the Earth, at least one terrestrial station and at least one terrestrial mobile terminal, said system including bidirectional transmission links between said geostationary satellite and each of said terrestrial mobile terminals and bidirectional transmission links between said geostationary satellite and each terrestrial station, at least one auxiliary satellite co-located in said particular orbit and a transmission link between each of said terrestrial mobile terminals and each co-located auxiliary satellite and an intersatellite transmission link between each co-located auxiliary satellites and the geostationary communication satellite to form a spatial diversity communication system.

2. System according to claim 1 wherein said co-located auxiliary satellite is at a distance from said geostationary satellite in said particular orbit in the range of 200 km and 400 km.

3. System according to claim 1 wherein said transmission link between each of said terrestrial mobile terminals and said "co-located" auxiliary satellite is a unidirectional uplink on which spatial diversity radio signals from said terrestrial mobile terminals are received.

4. System according to claim 1 wherein said intersatellite transmission link between said co-located auxiliary satellite and said geostationary satellite is a unidirectional transmission link transmitting to the geostationary satellite spatial diversity signals received from said terrestrial mobile terminals.

5. System according to claim 1 wherein the spatial diversity signals received by said co-located auxiliary satellite and transmitted via said intersatellite transmission link to said geostationary satellite are combined in said geostationary satellite with direct signals received by the latter via an uplink of said bidirectional transmission links between said geostationary satellite and each of said terrestrial mobile terminals and the combined signals are retransmitted on a single channel via a downlink of said bidirectional transmission links between the geostationary satellite and said terrestrial station.

6. System according to claim 1 wherein the spatial diversity signals received by said co-located auxiliary satellite and transmitted via said intersatellite transmission link to said geostationary satellite are retransmitted via a downlink of said bidirectional transmission links between said geostationary satellite and said terrestrial station, direct signals received by said geostationary satellite via an uplink of said bidirectional transmission links between the main satellite and each of said terrestrial mobile terminals are also retransmitted via said downlink without being combined with said diversity signals, and said direct signals and said diversity signals are combined in said terrestrial station.

7. System according to claim 1 wherein said radio signals are transmitted in the L band.

8. System according to claim 1 wherein said radio signals are transmitted in the S band.

9. System according to claim 1 wherein said terrestrial mobile terminals are portable terminals.

10. System according to claim 1 comprising a second co-located satellite, said co-located auxiliary satellites on each side of said geostationary satellite in said particular orbit.

11. System according to claim 10 wherein each of said co-located auxiliary satellites is at a distance from said geostationary satellite in said particular orbit in the range of 200 km and 400 km.

12. System according to claim 10 wherein said transmission link between each of said terrestrial mobile terminals and each of said co-located auxiliary satellites is a unidirectional uplink on which spatial diversity radio signals from said terrestrial mobile terminals are received.

13. System according to claim 10 wherein said intersatellite transmission link between each of said co-located auxiliary satellites and said geostationary satellite is a unidirectional transmission link transmitting to the geostationary satellite spatial diversity signal received from said terrestrial mobile terminals.

14. System according to claim 10 wherein the spatial diversity signals received by said co-located auxiliary satellites and transmitted via said intersatellite transmission link to said geostationary satellite are combined in said geostationary satellite with direct signals received by the latter via an uplink of said bidirectional transmission links between said geostationary satellite and each of said terrestrial mobile terminals and the combined signals are retransmitted on a single channel via a downlink of said bidirectional transmission links between the geostationary satellite and said terrestrial station.

15. System according to claim 10 wherein the spatial diversity signals received by said co-located auxiliary satellites and transmitted via said intersatellite transmission link to said geostationary satellite are retransmitted via a downlink of said bidirectional transmission links between said geostationary satellite and said terrestrial station, direct signals received by said geostationary satellite via an uplink of said bidirectional transmission links between the main satellite and each of said terrestrial mobile terminals are also retransmitted via said downlink without being combined with said diversity signals, and said direct signals and said diversity signals are combined in said terrestrial station.

* * * * *